United States Patent [19]
Kohl et al.

[11] Patent Number: 5,602,470
[45] Date of Patent: Feb. 11, 1997

[54] CIRCUIT ARRANGEMENT FOR STARTING DETECTION OF THREE-PHASE GENERATOR

[75] Inventors: Walter Kohl, Bietigheim-Bissingen; Rainer Mittag, Kornwestheim; Matthias Hoeber, Aachen, all of Germany

[73] Assignee: Robert Bosch GmbH, Stuttgart, Germany

[21] Appl. No.: 416,780

[22] PCT Filed: Jul. 23, 1994

[86] PCT No.: PCT/DE94/00856

§ 371 Date: Apr. 10, 1995

§ 102(e) Date: Apr. 10, 1995

[87] PCT Pub. No.: WO95/05606

PCT Pub. Date: Feb. 23, 1995

[30] Foreign Application Priority Data

Aug. 16, 1993 [DE] Germany .................. 43 27 485.4

[51] Int. Cl.⁶ .................................................. G01P 3/46
[52] U.S. Cl. ............................ 324/177; 324/166; 322/28
[58] Field of Search ................................ 324/166, 177; 322/28, 60, 69, 27; 320/64, 68

[56] References Cited

U.S. PATENT DOCUMENTS 4,079,306  3/1978  Mori et al. ......................... 322/28
5,107,198  4/1992  Meyer et al. ......................... 322/60

FOREIGN PATENT DOCUMENTS 0128519  6/1984  European Pat. Off. .
0247994  5/1987  European Pat. Off. .
90/07218  6/1990  WIPO .

OTHER PUBLICATIONS

Autoelektrik Autoelektronik Manual, Bosch, 1987, pp. 24–29 1987.

*Primary Examiner*—Sandra L. O'Shea
*Assistant Examiner*—Jay M. Patidar
*Attorney, Agent, or Firm*—Michael J. Striker

[57] ABSTRACT

In a circuit arrangement for measuring a starting of rotation of a generator having an exciting winding and three-phase windings, a voltage regulator regulates an output voltage of the generator by influencing an exciting current, the three-phase windings are connected to one another at a point, one of the phase windings is connected to ground via a first resistor, another of the phase windings is connected to ground via a second resistor, a voltage across the first resistor is evaluated as a rotational-speed-dependent alternating voltage, this voltage is compared with a threshold voltage, and the starting of the rotation of the generator is detected when the measured voltage exceeds the threshold voltage.

3 Claims, 2 Drawing Sheets

CIRCUIT ARRANGEMENT FOR STARTING DETECTION OF THREE-PHASE GENERATOR

BACKGROUND OF THE INVENTION

The present invention relates to a circuit arrangement for measuring the rotational speed of a generator. More particularly, it relates to a circuit arrangement for a starting detection of a three-phase generator.

In motor vehicles, three-phase generators which excite themselves after the motor driving them has started up are usually used to generate the electrical energy. So that this self-excitation occurs reliably and safely, measures which improve the self-excitation are usually initiated directly after the motor vehicle engine starts.

One customary method consists in using the charge monitoring lamp to pre-excite the generator. For this purpose, during starting, energy is fed to the exciter winding from the battery via the charge monitoring lamp. Another method consists in providing an additional lead between the battery and the exciter winding of the generator and conducting an additional exciter current via this connection during the starting process.

The aforesaid measures are disclosed, for example, in the German Offenlegungsschrift 38 43 161 and the corresponding U.S. Pat. No. 5,107,198. In the known solutions, additional means for detecting the start of the engine are required.

However, in generator voltage controller systems, it is also known to use the rotational-speed-dependent alternating voltage in a phase winding of the three-phase generator in order to detect starting. In such a case, a voltage measurement is carried out in the voltage controller, during which voltage measurement the voltage is measured between the phase and earth and, when a threshold value is exceeded, it is detected that the engine is starting and thus the three-phase generator is beginning to rotate.

This type of starting detection has the disadvantage that, if the switch-on threshold is too high, the cut-in speed of the generator is too high and, if the threshold is too low, the signal-to-noise ratio becomes too small, so that starting may be detected erroneously.

SUMMARY OF THE INVENTION

Accordingly, it is an object of the present invention to provide a circuit arrangement of the above mentioned general type, which avoids the disadvantages of the prior art.

More particularly, it is an object of the present invention to provide a circuit arrangement of the above mentioned type, which has the advantage that either the threshold voltage can be increased when the cut-in speed is the same, as a result of which the signal-to-noise ratio is improved, or that the cut-in speed can be lowered. The threshold voltage here is the voltage which, when exceeded, permits the start of rotation of the generator to be detected.

This advantage is achieved in that the voltage between one phase and earth is evaluated in a generator with star-connected phase windings, while a different phase winding is connected to earth via a further resistor. By means of this measure, a voltage divider is obtained which consists of the input resistor of the voltage meter and the additional resistor, this voltage divider being connected to the phase-to-phase voltage between the two phase windings. This phase-to-phase voltage is higher than the phase voltage by a factor $\sqrt{3}$.

Furthermore, it is advantageous that the threshold voltage which, when exceeded, permits the start of rotation of the generator to be detected, can be set easily by suitable selection or variation of the further resistor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings. FIG. 1 shows a circuit arrangement according to the invention, and in FIG. 2 an equivalent circuit diagram is illustrated which permits the relationships to be more easily recognized.

DESCRIPTION OF THE PREFERRED EMBODIMENTS

Figure 1:
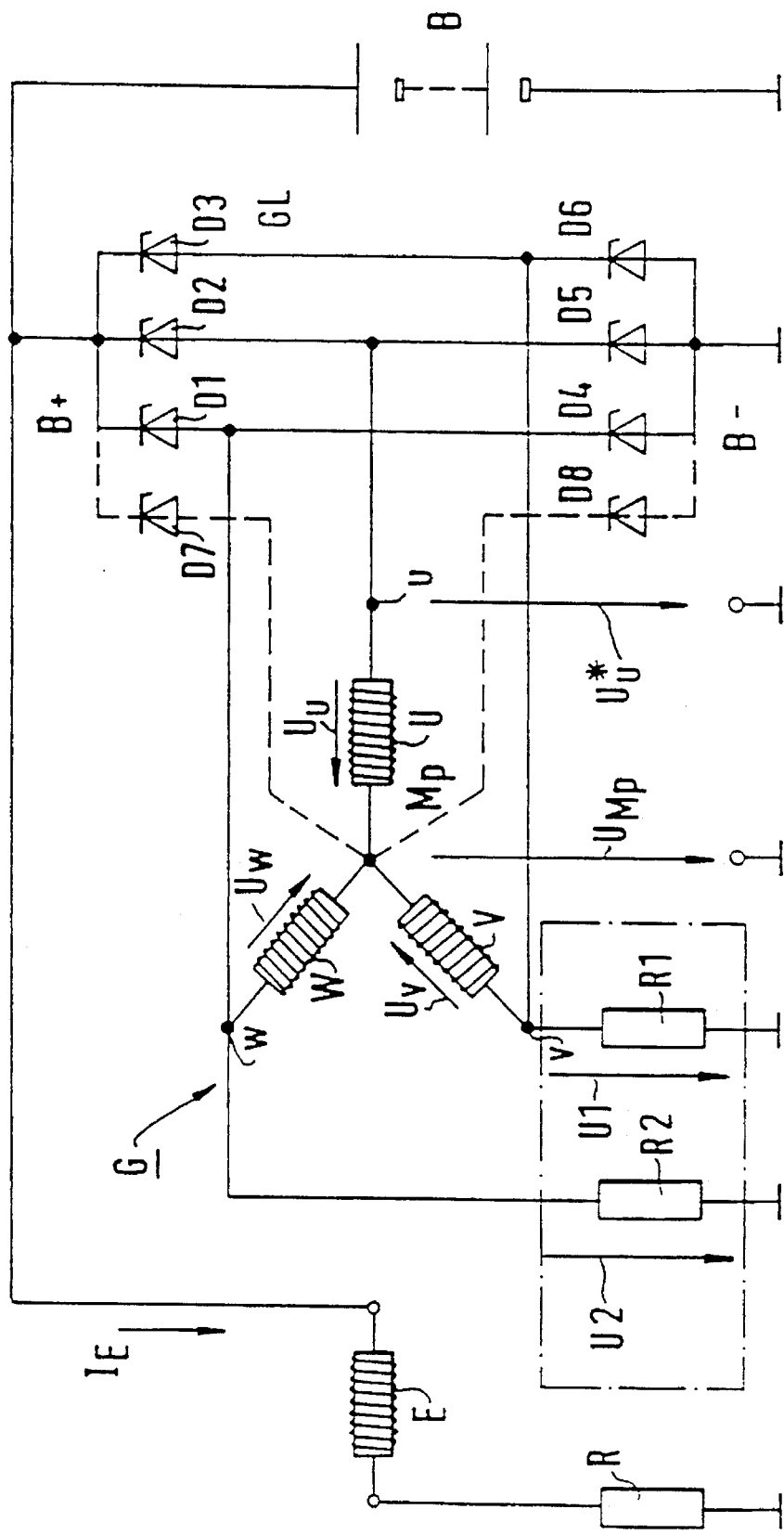

FIG. 1 illustrates a three-phase generator G with the phase windings U, W and V which are connected to one another at a common center point MP. The phase windings U, V and W are connected to the diodes or Zener diodes of the rectifier bridge GL via connections u, v, w.

The rectifier diodes GL are connected via connections B+ to the positive pole of the battery and via B– to the negative pole of the battery B or earth. In each case a further diode or Zener diode D7, D8 can be connected between the center point MP between the phase windings and B+ or B–. The diodes of the rectifier bridge are designated by D1 to D6.

The phase windings u, v, w have voltages Uu, Uv, Uw. The voltage Uu is present between the connection u of the winding u as shown in FIG. 1. The voltage $U_u$ is present between the connection u and the ground as shown in FIG. 1.

In order to measure the rotational speed $n_G$ of the generator, the resistor R1 across which the voltage U1 drops is connected between the connection v of the phase winding V and earth. This resistor R1 is the internal resistor or the input resistor of a voltage detection device S.

The rotational speed of the generator G can be determined from the voltage U1, which is a rotational-speed-dependent alternating voltage, in that for example the period of the alternating voltage is determined and the rotational speed is calculated from it in a known manner. By evaluating the level of the voltage U1 and comparing it with a threshold voltage US, a rotation of the generator can be detected when the voltage U1 exceeds the voltage US.

An additional resistor R2 across which the voltage U2 drops is connected between the connection w and earth. This resistor substantially improves the voltage evaluation at R1, so that the detection of the rotation of the generator is also improved.

The evaluations are usually also carried out in the voltage regulator R.

Figure 2:
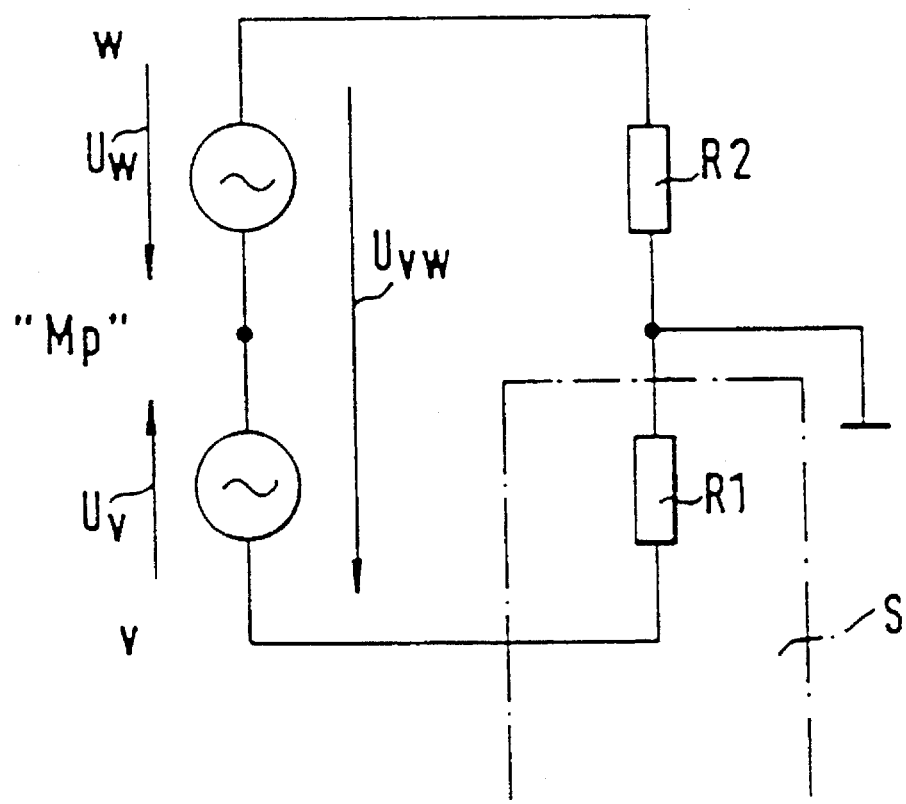

In FIG. 2 an equivalent circuit diagram with the voltage sources Uv and Uw is illustrated, the said diagram indicating the voltage division in a circuit with the resistor R2. In this arrangement, the two voltage sources replace the phase windings V and W with the voltages Uv and Uw.

If a generator phase which is different from that used for detection of the rotational speed in the regulator is connected to earth via a resistor R2, a voltage divider consisting of R2 and the input resistor R1 of the voltage-detection and the rotational-speed-detection circuit of the voltage regulator is connected to the phase-to-phase voltage Uvw of the generator in the arrangement selected in the exemplary embodiment. This voltage is higher than the phase voltage by the factor $\sqrt{3}$.

Since the voltage to be evaluated is greater than one of the phase voltages by the factor $\sqrt{3}$, in comparison with rotational-speed measurement using the evaluation of a phase voltage, there is a greater voltage range which can be utilized to determine the start of rotation of the generator.

Thus, the voltage limit value which, when exceeded, permits rotation of the generator to be detected can be increased in the voltage range which is made higher by $\sqrt{3}$, as a result of which the signal-to-noise ratio is enlarged and the risk of rotation of the generator being erroneously detected is reduced.

However, it is also possible to operate with a relatively low limit value; as a result of the voltage which is increased by $\sqrt{3}$, in comparison with the evaluation with a phase voltage alone, rotation of the generator is detected earlier and the excitation can be initiated at an earlier point; the so-called cut-in speed of the generator is then lower in comparison with evaluation using one of the phase voltages without the additional resistor according to the invention.

By varying the value of R2, any desired voltage to earth can be set at the fixed input resistor R1 of the voltage regulator. The threshold voltage at R1 can thus be reduced by means of R2, so that the rotation of the generator is detected by the voltage regulator at lower rotational speeds of the generator when the measured voltage exceeds the threshold voltage.

After it has been detected that the generator is rotating, the start of the internal combustion engine is also detected and the voltage regular R can directly initiate measures which bring about an improvement in pre-excitation.

Reference E identifies an exciting winding of the generator while reference $I_E$ identifies an exciter current which flows through the exciting winding and controls the voltage regulator R so that the initial voltage of the generator increases to a desired value. These generator components are known from the prior art and described for example in U.S. Pat. No. 5,107,198.

It will be understood that each of the elements described above, or two or more together, may also find a useful application in other types of constructions differing from the types described above.

While the invention has been illustrated and described as embodied in a circuit arrangement for starting detection of three-phase generator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A circuit arrangement for a starting detection of a generator having an exciter winding and three-phase windings, comprising a voltage regulator which regulates an output voltage of the generator by influencing an exciting current of the exciter winding; means for connecting the three-phase windings of the generator at a point; a first resistor arranged so that one of the phase windings is connected to ground via said first resistor; a second resistor arranged so that another of the phase windings is connected to ground via said second resistor; means for evaluating a voltage across said first resistor as a rotational-speed-dependent alternating voltage; means for comparing said rotational-speed-dependent alternating voltage with a threshold voltage; and means for detecting a beginning of the rotation of the generator when the evaluated voltage exceeds the threshold voltage.

2. A circuit arrangement as defined in claim 1, wherein said second resistor is variable so that a predetermined voltage to ground is set at said first resistor.

3. A circuit arrangement as defined in claim 1, wherein said voltage regulator is formed so that after it has been detected that the generator is rotating, said voltage regulator initiates an excitation.

* * * * *